(12) United States Patent
Huhse et al.

(10) Patent No.: US 12,506,983 B2
(45) Date of Patent: Dec. 23, 2025

(54) METHOD FOR CORRECTING MEASUREMENT VALUES OF AN OPTICAL DETECTION CHANNEL

(71) Applicant: CARL ZEISS MICROSCOPY GMBH, Jena (DE)

(72) Inventors: Dieter Huhse, Jena (DE); Wiebke Hilbert, Jena (DE); Joerg Steinert, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 44 days.

(21) Appl. No.: 18/752,123

(22) Filed: Jun. 24, 2024

(65) Prior Publication Data
US 2025/0008234 A1    Jan. 2, 2025

(30) Foreign Application Priority Data
Jun. 27, 2023  (DE) ...................... 10 2023 206 048.5

(51) Int. Cl.
*H04N 25/68* (2023.01)
(52) U.S. Cl.
CPC ................... *H04N 25/68* (2023.01)
(58) Field of Classification Search
CPC ............... H04N 25/68; H04N 2201/04787
USPC ........................................... 348/246
See application file for complete search history.

(56) References Cited

U.S. PATENT DOCUMENTS

| | | | |
|---|---|---|---|
| 10,101,203 B2 | 10/2018 | Birk et al. | |
| 10,564,098 B2 | 2/2020 | Barich et al. | |
| 2007/0040920 A1* | 2/2007 | Kinoshita | H04N 25/68 348/E5.081 |
| 2016/0006960 A1* | 1/2016 | Takahashi | H04N 25/68 348/246 |
| 2016/0216381 A1 | 7/2016 | Nishihara et al. | |

FOREIGN PATENT DOCUMENTS

DE    102011107645 A1    1/2013

* cited by examiner

*Primary Examiner* — Joel W Fosselman
(74) *Attorney, Agent, or Firm* — Brake Hughes Bellermann LLP (57) ABSTRACT

Measurement values of a detection channel are corrected, where measurement values are acquired from an arrangement of a plurality of individually readable optical individual detectors, and the measurement values of a selection of the optical individual detectors of the array are assigned to a detection channel. A plurality of optical individual detectors are combined in accordance with a basic pattern to form a respective detection channel and their measurement values are jointly assigned to the detection channel. If at least one defective individual detector is present, the combination in accordance with the basic pattern is cancelled. For the cancelled combination of individual detectors, a changed basic pattern is defined and measurement values of the individual detectors are acquired according to the changed basic pattern. The measurement values of the defective individual detector are corrected using measurement values of individual detectors around the defective detector in the changed basic pattern.

13 Claims, 6 Drawing Sheets

METHOD FOR CORRECTING MEASUREMENT VALUES OF AN OPTICAL DETECTION CHANNEL

CROSS REFERENCE TO RELATED APPLICATION

This application claims priority to German Application No. 10 2023 206 048.5, filed Jun. 27, 2023, the disclosure of which is incorporated herein by reference in its entirety.

TECHNICAL FIELD

This disclosure relates to a method for correcting measurement values of one or more optical detection channels according to the preamble of the independent claim.

SUMMARY

For acquiring measurement values, in particular, intensity values of acquired radiation in the visible and non-visible wavelength ranges, detectors constructed from a plurality of individual detector elements (hereinafter also called: individual detectors or pixels) are often used in the field of modern microscopy. Examples thereof are CCD chips and arrays of photodiodes, in particular, avalanche photodiodes (Avalanche Photodiode=APD; Single Photon Avalanche Diode=SPAD). Selected individual detectors can be combined to form detection channels, and their measurement values can be read out as a common value and used further.

Within such arrangements of many detector elements (array detector), it may happen that individual detector elements exhibit an undesired behavior. In this regard, e.g. either detector elements may not function at all (so-called "dead pixels"), or they may have a very much higher level of noise than the average of the other detector elements (noise pixels or "screamers"). Hereinafter, both dead pixels and noise pixels are jointly encompassed by the term "defective individual detector" or "defective pixel".

Particularly when a detector with a large number of individual detectors is used, defective pixels can be ignored without relevant losses in the achievable image quality. Their measurement value is set to zero. Alternatively, the defective pixel can be allocated a corrected measurement value, which can be calculated, for example, as a mean value of the measurement values of the individual detectors surrounding the defective pixel (mean value method).

These procedures do not cause further disruption in many applications. In this regard, during the image recording of a widefield microscope using a CCD camera, where there is a defective pixel, the mean value method can simply be applied. By contrast, with the use of an array detector as a confocal detector, the measurement value of the defective pixel can be set to zero, which would then correspond to a reduction of the active area of the array detector and a slight decrease in the quantum efficiency, but other than that would not mean any disturbing effects or even corrupted results in most customary microscopy methods.

By contrast, if the position and the intensity of each individual pixel is of particular importance for the evaluation method used, the options mentioned above for dealing with defective pixels are not very suitable.

Techniques described herein are based on the object of proposing improved possibilities for dealing with defective pixels which are assigned to a detection channel.

The object is achieved by a method for correcting measurement values of a more particularly optical detection channel and to advantageous developments and variants.

The measurement values can be used directly as image values or can be converted into image values. The measurement values are acquired by means of a predetermined, i.e. known, arrangement (array) of a plurality of individually readable optical individual detectors. In this case, the individual detectors are not necessarily arranged in a regular pattern, but rather can also be arranged irregularly but always with known positions and relative poses with respect to one another.

Acquired measurement values of a selection of the optical individual detectors of the array are assigned to a respective detection channel. A detection channel within the meaning of this description is thus formed by combination of at least two individual detectors ("binning"), i.e. the joint acquisition of their measurement values. An advantage of this procedure is that the amount of data that needs to be forwarded and processed is smaller than if each individual detector is actually read individually.

According to some implementations, the method is characterized in that a plurality of optical individual detectors are combined in accordance with a predefined or selected basic pattern to form a respective detection channel (binning) and their measurement values are jointly assigned to the relevant detection channel. A basic pattern is understood hereinafter to be a defined spatial configuration or rule according to which the individual detectors are assigned to a detection channel. Usually, but not mandatorily, at least two detection channels are present.

If at least one defective individual detector occurs, the combination in accordance with the basic pattern is canceled at least for the relevant detection channel. For the canceled combination of individual detectors, a changed basic pattern is defined and the measurement values of the individual detectors are acquired in the meantime according to the changed basic pattern.

Using measurement values of individual detectors of the changed basic pattern, which individual detectors are preferably arranged in a manner surrounding, in particular adjacent to, the defective individual detector, at least one measurement value of the defective individual detector is corrected. After correction of the measurement values of the respective defective individual detectors has taken place, this is followed by carrying out a subsequent acquisition and/or evaluation of the acquired measurement values for each detection channel according to the original basic pattern.

The basic pattern can be chosen according to the respective requirements of the optical device used, for example of a microscope, and also the requirements of the evaluation routines to be applied and desired specifications of the image qualities.

In one advantageous configuration, the individual detectors are respectively arranged adjacent to one another in accordance with the basic pattern. In this way, the measurement value of the defective pixel can be corrected taking into consideration the measurement values of the individual detectors spatially positioned the nearest.

In further configurations, additionally or alternatively, measurement values from individual detectors can be concomitantly included for determining a corrected measurement value. Implementations are described below by way of example on the basis of one defective pixel, but implementations can also be applied if more than one defective pixel per detection channel occurs or defective pixels occur in different detection channels.

In order to correct the measurement value of the defective pixel, the measurement values of the individual detectors directly and/or more distantly adjacent to the defective individual detector can be individually read out, and a mean value can be formed from these measurement values. The mean value is allocated to the defective individual detector as a corrected measurement value. In configurations of the method, an adjacent individual detector need not necessarily directly adjoin the defective pixel. The individual detectors assigned to the detection channel are read, without the individual detectors used for forming the mean value, in the sense of a changed basic pattern and are assigned to the detection channel. Subsequently, the measurement values and the corrected measurement values are assigned to each detection channel in accordance with the basic pattern. This assignment can take place afterward in the course of a data acquisition or an evaluation of the measurement values of the detection channels.

At least one of the adjacent individual detectors used for correction is assigned to a different detection channel than the defective individual detector in accordance with the basic pattern. This ensures that when determining the corrected measurement value, not only the individual detectors of the relevant detection channel are involved and the changed basic pattern deviates from the basic pattern originally defined.

In a further developed configuration, out of the individual detectors used for forming the mean value, those which belong to a respective common detection channel in accordance with the basic pattern can be combined. In this way, advantageously, even fewer data need to be transmitted, or even fewer acquisition units (counters) used for acquiring, for example, for counting or adding, the respective measurement values that are required. A corresponding weighting of the contributions of the combined individual detectors is advantageous.

In a further implementation, use is made of at least a first and a second acquisition unit (counter), by means of which measurement values of separate individual detectors can be acquired simultaneously and independently of one another without loss of information, that is to say without loss of counting.

In this case, the individual detectors of the detection channel having a defective individual detector are combined, without the defective individual detector, in the sense of a changed basic pattern and their measurement values are fed to a first acquisition unit. Moreover, individual detectors adjacent to the defective individual detector are combined, specifically without the defective pixel, and their measurement values are fed to a second acquisition unit. The combined measurement values of the second acquisition unit are used to calculate a corrected measurement value and to assign the latter to the defective individual detector as a corrected measurement value.

The evaluation of the detection channels subsequently takes place again according to the combinations of the individual detectors governed by the basic pattern.

The advantage over the preceding implementation is that fewer additional acquisition units are required. The advantage over the variant described below is that the result is more accurate.

The corrected measurement value in accordance with the configuration described above can advantageously be determined by virtue of the combined measurement values determined by means of the second acquisition unit being used for calculating a corrected measurement value, in particular an arithmetic mean value. The sum of its measurement values is multiplied by a factor $1/n^*$, where $n^*$ is the number of individual detectors of the changed basic pattern.

The mean value formation can involve rounding to whole numbers. Specific statistical distributions can be taken into consideration in the rounding to whole numbers. For example, the Poisson distribution of the number of photons can be taken into consideration in the rounding method. That also applies to the other variants.

In a further implementation, the correction of measurement values of a detection channel can also be effected by those individual detectors whose measurement values are assigned to a specific detection channel and which comprise at least one defective individual detector being combined in accordance with a changed basic pattern without the defective individual detector. The common measurement values of the relevant detection channel are then multiplied by a factor $n/(n-m)$, where n is the number of individual detectors assigned to the detection channel in accordance with the basic pattern and m is the number of defective individual detectors of the individual detectors assigned to the detection channel in accordance with the basic pattern. The result is used for correcting the measurement values of the defective individual detectors.

For all mentioned configurations of the invention, the corrected measurement values can be, for example, arithmetic or weighted mean values, or solutions of regression equations. In the case of the latter, for example, a line can be virtually placed over a number of individual detectors adjacent to the defective pixel, and a regression equation can be determined on the basis of the respective measurement values, and a corrected measurement value for the defective pixel being determined on the basis of said regression equation.

Implementations can advantageously be used in a method in which the distribution of the measurement values of the detection channels, in particular expressed as intensities, is used for determining an original location of a signal on which the measurement values are based. In this case, the knowledge of the concrete position of the respective defective pixel can be taken into account in a subsequent evaluation. By way of example, in a succeeding evaluation, a correction of the spatial location of the centroid of the acquired measurement values (intensity distribution) of the affected detection channels can be carried out.

Carrying out the implementations described herein requires knowledge about the presence of defective pixels and the respective position thereof within the array of individual detectors. This can be obtained in various ways and be kept available for use in the implementations. It is possible, for example, for the positions and numbers of the defective individual detectors to be determined beforehand, i.e. before the method is carried out, and stored repeatedly retrievably. By way of example, the array detector to be used can be examined under defined conditions with regard to the noise characteristic and the functionality of its individual detectors. If, in the process, defective individual detectors are ascertained whose noise behavior deviates distinctly from the noise behavior of the other individual detectors or whose noise exceeds a predetermined threshold value ("hot pixel" or "screamer") or which do not communicate measurement values ("dead pixel"), their individual positions are stored repeatedly retrievably. This can preferably be done electronically in lists, for example, in so-called LUTs ("look-up tables").

The criteria that are the deciding factor regarding use or rejection of the pixels can be dependent on the respective application. There can be, for example, a plurality of lists for different applications.

In order, alternatively or additionally, to be able to react to the circumstance that the noise behavior of the "screamers" possibly changes over the period of use of the array detector and/or that this behavior is manifested differently under changing operating conditions such as rising or falling ambient temperature, the behavior of the individual detectors can be repeatedly examined after a predefined time period and/or after the occurrence of changed operating conditions. If appropriate, an available list of defective individual detectors of the array is updated.

Changes in the operating conditions can be determined on the basis of a respective threshold value of a predetermined operating parameter. For this purpose, for example, the instance of a defined threshold value being exceeded or undershot can be used as an absolute feature of a changing operating state.

Furthermore, it is possible to use relative changes as a decision basis. In this regard, a difference between the values of an operating parameter, for example, the ambient temperature, and a reference state applicable until then can be determined and a permissible deviation from the reference state can be used for ascertaining a changed operating state. A temperature change of 10 K, for example, or of intervals each of 10 K relative to an initial temperature fixed as a reference state can be defined in each case as a change in the operating conditions and lead to checking for defective individual detectors and an update of the list. For absolute or relative changes in operating conditions, too, lists can be created, stored repeatedly retrievably and, if appropriate, updated.

Implementations are directed to the correction of measurement values of optical detection channels, where these are formed from a plurality of measurement values. In the case of the combination or "binning" already discussed, the provision of erroneous values of the relevant detection channel can be reduced by means of implementations described herein.

Techniques described herein are of particular importance if the values of a detection channel together with the relative spatial location thereof within the array of individual detectors are taken into account. In this regard, for example, on the basis of the spatial positions of the detection channels on the array and their measurement values, a localization of an original location of the signal acquired by means of the array can take place computationally and this localization is in particular below the diffraction-limited resolution of the detection optical unit used.

In particular, measurement values of a plurality of detection channels can be evaluated and an intensity distribution of acquired measurement values of at least one object to be imaged can be determined. By way of example, an object to be imaged can be a sample which is marked with fluorophores and which emits fluorescent light of at least one specific wavelength. The fluorophores can be excited to emission of the fluorescent light by means of suitable excitation radiation, as is known from the field of fluorescence microscopy, for example.

The intensity distribution can be used for determining the original location of a signal on which the measurement values are based. In this case, the spatial resolution of the original location is advantageously better than a diffraction-limited determination of the original location.

For carrying out the techniques described herein, a microscope can be used, the control unit and/or evaluation unit of the microscope being configured for implementing the techniques, in particular in the variants described in even more specific detail below. Such a microscope is encompassed by the invention described herein.

BRIEF DESCRIPTION OF THE DRAWINGS

The invention is explained in greater detail below on the basis of exemplary embodiments and drawings, in which.

DETAILED DESCRIPTION

Figure 1:
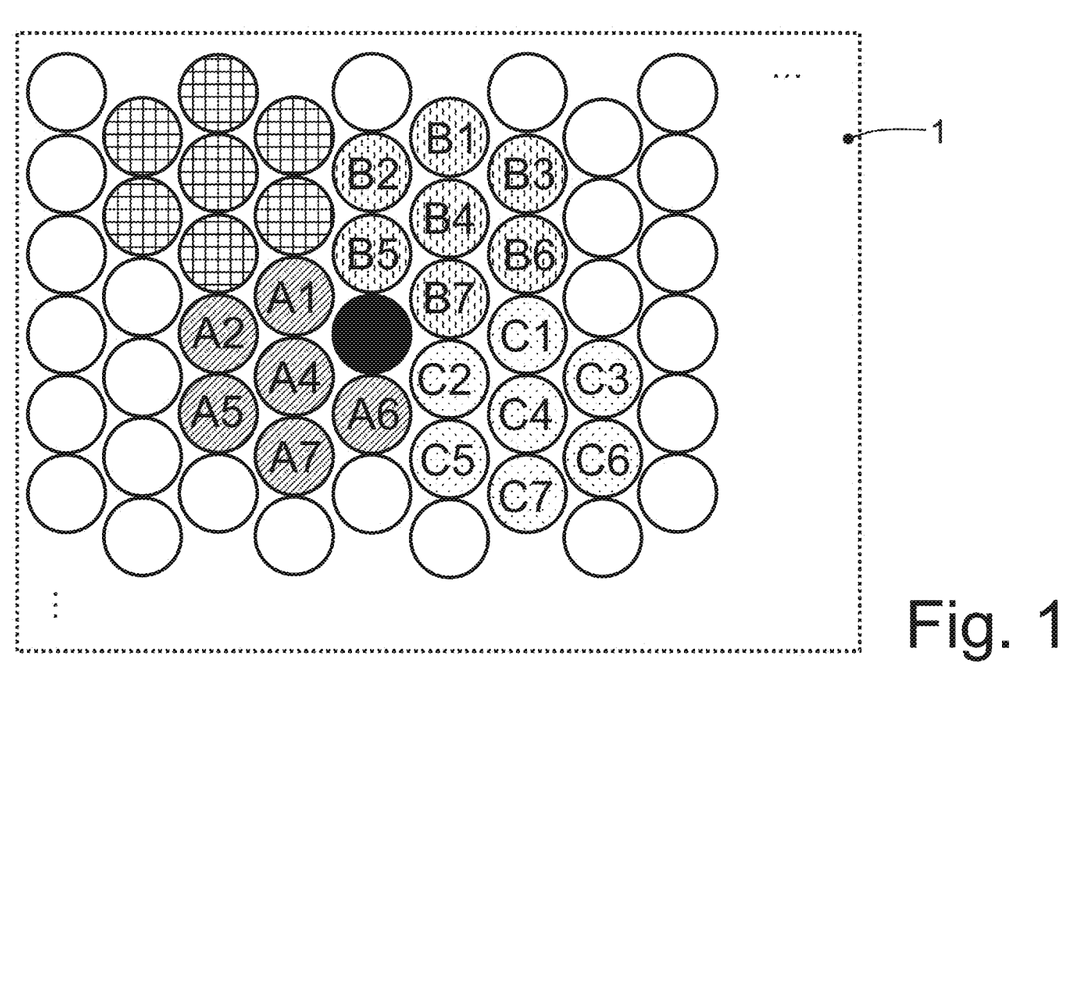
FIG. 1 shows a schematic illustration of a detail from an array detector and, by way of example, a combination (binning) of, in each case, a plurality of individual detectors to form detection channels in the plan view of the detection area of the array detector.

When carrying out the techniques disclosed herein, use is made of an array 1—known in principle—of individual detectors, a selection of which here and hereinafter are designated by way of example by A1 to A7, B1 to B7, and respectively C1 to C7. FIG. 1 merely shows a detail from the entire detection area of the array detector 1. In each case seven individual detectors A1 to A7, B1 to B7, and respectively C1 to C7 are combined (binning) and in each case form a detection channel DA, DB, and respectively DC (see FIG. 2). Further detection channels can be formed, as shown by way of example in FIG. 1 by the seven individual detectors filled in with a rectangular pattern.

A defective pixel A3 was ascertained within the individual detectors A1 to A7 assigned to the detection channel DA, which defective pixel either generates excessive noise or provides no signals at all. The exemplary assumption that the individual detector A3 highlighted in black constitutes a defective pixel is applicable to all the exemplary embodiments.

Figure 2:
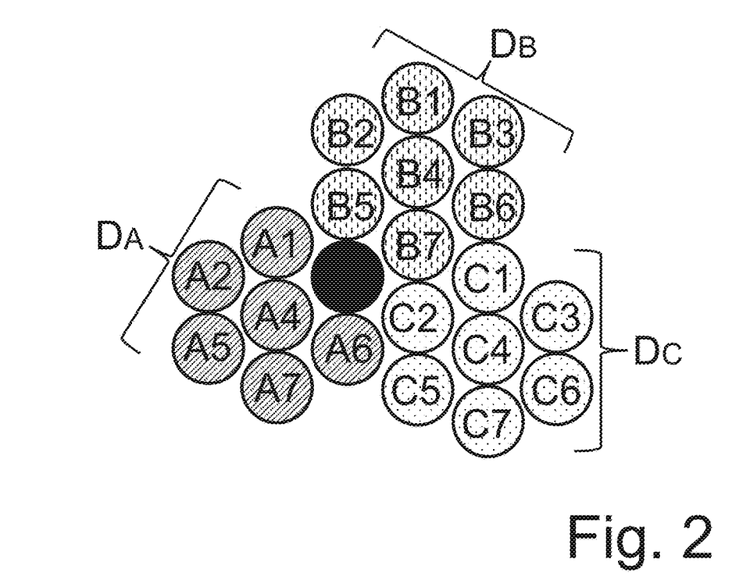
FIG. 2 shows a schematic illustration of three detection channels with a defective pixel on an array detector with individual detectors arranged periodically offset with respect to one another.

The individual detectors A1 to C7 shown in FIG. 2 are arranged vertically and horizontally periodically offset relative to one another, as is customary, for example, in APD arrays or SPAD arrays. The individual detectors A1 to A7, B1 to B7, and respectively C1 to C7 are arranged in basic patterns, in each of which six of the individual detectors are present around a central individual detector A4, B4, and respectively C4. In further configurations of the method, other basic patterns can be chosen.

Figure 3:
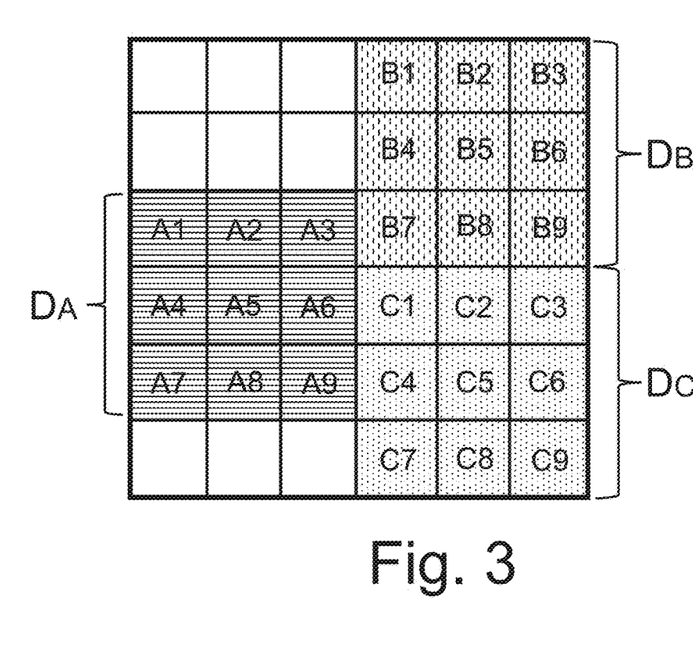
FIG. 3 shows a schematic illustration of three detection channels on an array detector with individual detectors arranged in rows and in columns.

For the implementations disclosed herein, it is also possible to use array detectors 1 in which the individual detectors, in this example A1 to C9, are arranged in rows and columns (FIG. 3). Such array detectors can be CCD or CMOS chips, for example. In the exemplary embodiment in accordance with FIG. 3, in each case nine individual detectors A1 to A9, B1 to B9, and respectively C1 to C9 are arranged in basic patterns of 3×3 individual detectors and are assigned to the respective detection channels DA, DB, and DC.

The detection channels DA, DB, and DC are offset relative to one another in the vertical direction.

In further implementations, the manner of combination to form detection channels can be implemented differently than described above. Moreover, other numbers of individual detectors and/or other relative locations with respect to one another can be realized.

Figure 4:
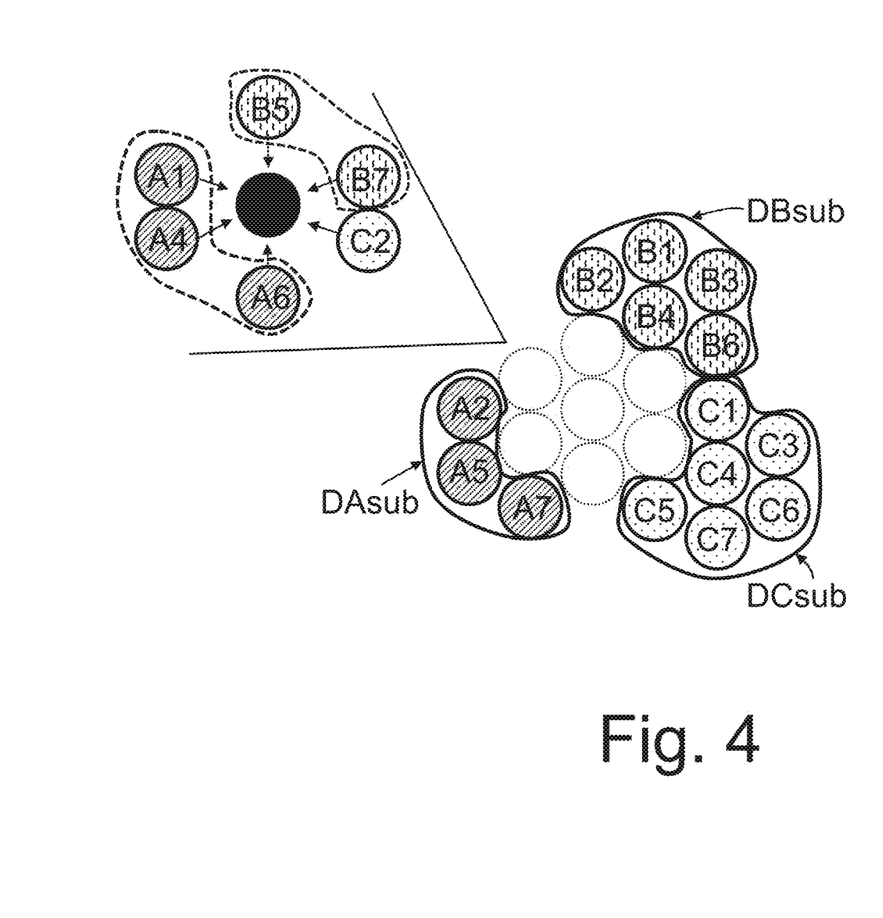
FIG. 4 shows a schematic illustration of a first configuration of an implementation (variant A)
Figure 5:
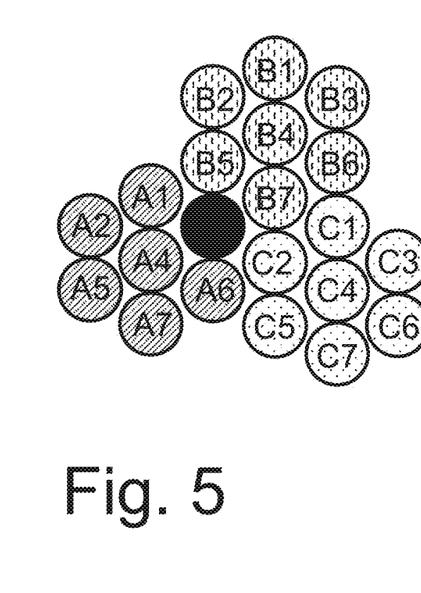
FIG. 5 shows a schematic illustration of the assignment of measurement values that results from the method according to an implementation.

An implementation that is also referred to here as variant A is illustrated in FIGS. 4 and 5. The measurement values of the individual detectors A1, A4, A6, B5, B7, and C2 directly adjacent to the defective pixel A3 are individually read out and kept available at least for determining a corrected measurement value. The remaining individual detectors of each detection channel DA, DB, and DC are combined in the sense of a changed basic pattern. This concerns the individual detectors A2, A5, and A7 for the detection channel DA, the individual detectors B1 to B4 and B6 for the detection channel DB, and the individual detectors C1 and C3 to C7 for the detection channel DC. The detection channels thus formed in the meantime on account of the changed basic patterns are designated as DAsub, DBsub, and respectively as DCsub (FIG. 4).

The measurement values of the individual detectors A1, A4, A6, B5, B7, and C2 are used to calculate a mean value from them (see drawn out image excerpt). This mean value thus determined is assigned to the defective pixel A3 as a corrected measurement value, which is identified by A3$k$ (FIG. 5).

This procedure does increase the number of required acquisition units from three to nine, but that is still significantly smaller than if the twenty-one individual detectors of the three detection channels DA, DB, and DC were read individually.

In order to further reduce the amount of data during the determination of the corrected measurement value or to minimize the required number of acquisition units 8 (see FIGS. 6, 7 and 9), the individual detectors A1, A4, A6, and also B5 and B7 each belonging to a basic pattern can also be combined (indicated by interrupted full line). In a subsequent calculation of the corrected mean value, the contributions of the individual groups must then be weighted accordingly. A3$k$ in the example is thus calculated as follows:

$$A3k = (A1 + A4 + A6)/6 + (B5 + B7)/6 + C2)/6.$$

In this way, the number of required acquisition units 8 can be limited to six.

The defective pixel A3 is subsequently included in an evaluation as a pixel with a corrected measurement value A3$k$. In this case, the detection channel DA is used as a sum of the measurement values of the detection channel DAsub and also of the detectors A1, A4, A6—individually or already combined—and also A3$k$. The detection channels DB and DC are each made available to the evaluation as a sum of the detection channels DBsub and respectively DCsub and also of the respectively associated individual detectors B5 and B7 and respectively C2 in accordance with the basic pattern (FIG. 5).

Figure 6:
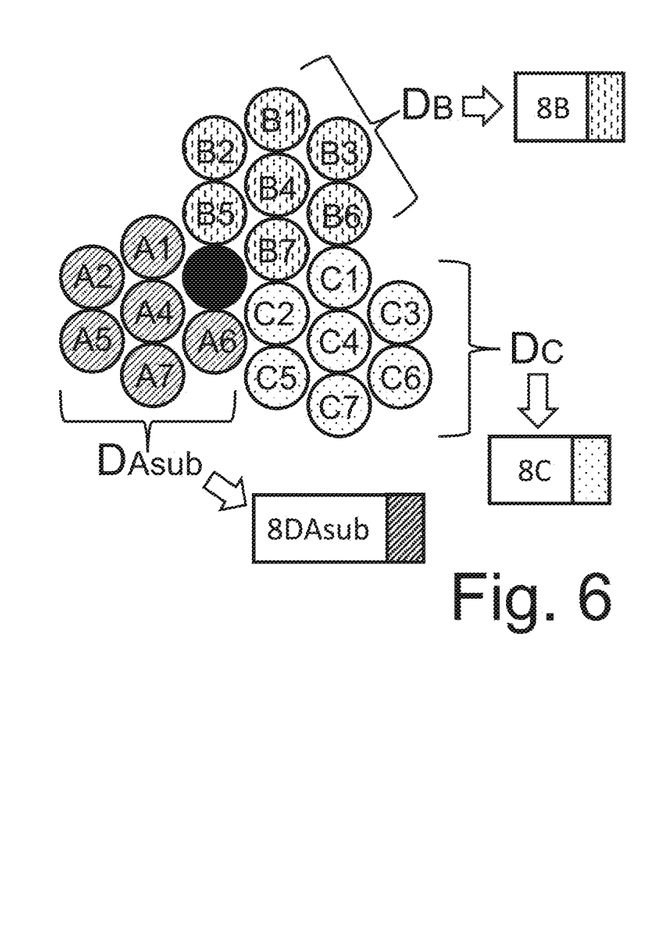
FIG. 6 shows a schematic illustration of a first sub-step of a second configuration an implementation (variant B)

In an implementation that is also referred to as variant B, a particular embodiment of the optical device used for carrying out the method, in particular of the microscope M (see FIG. 9), is required. In this implementation it is necessary that at least selected individual detectors, without loss of information, can be simultaneously allocated to two different acquisition units 8 (counters) and their measurement values can be registered, for example, both by means of a first acquisition unit 8DAsub and by means of a second acquisition unit 8$sec$ (FIGS. 6 and 7).

The individual detectors A1, A2, A4, A5, A6, and A7 are combined in a changed basic pattern in a detection channel DAsub and measured by the first acquisition unit 8DAsub. The individual detectors B1-B7 and also C1-C7 are combined in accordance with the basic pattern to form the detection channels DB and respectively DC and are acquired by means of the acquisition units 8B and respectively 8C.

Figure 7:
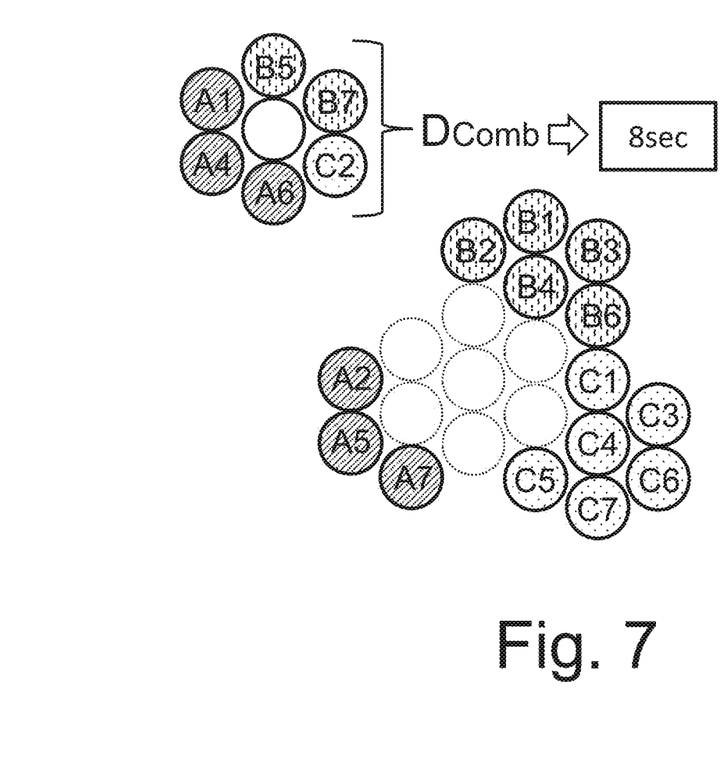
FIG. 7 shows a schematic illustration of a second sub-step of the second configuration of the method according to an implementation (variant B)

In addition, the individual detectors A1, A4, A6, B5, B7, C2 are combined and measured by means of the acquisition unit 8$sec$ (FIG. 7). The interim detection channel thus generated is referred to here as a combined detection channel Dcomb. The acquired value of the combined detection channel Dcomb is divided by the number of individual detectors involved in its arising, i.e. in this case six. The value thus calculated is allocated to the defective pixel A3 as a corrected measurement value (individual detector A3$k$). The number of acquisition units required is four in the example.

In order then to determine the value of the detection channel DA, the acquired measurement values of the detection channel DAsub and the value A3$k$ are added. The evaluation can then take place again in accordance with the respective basic patterns (see also FIG. 5).

Figure 8:
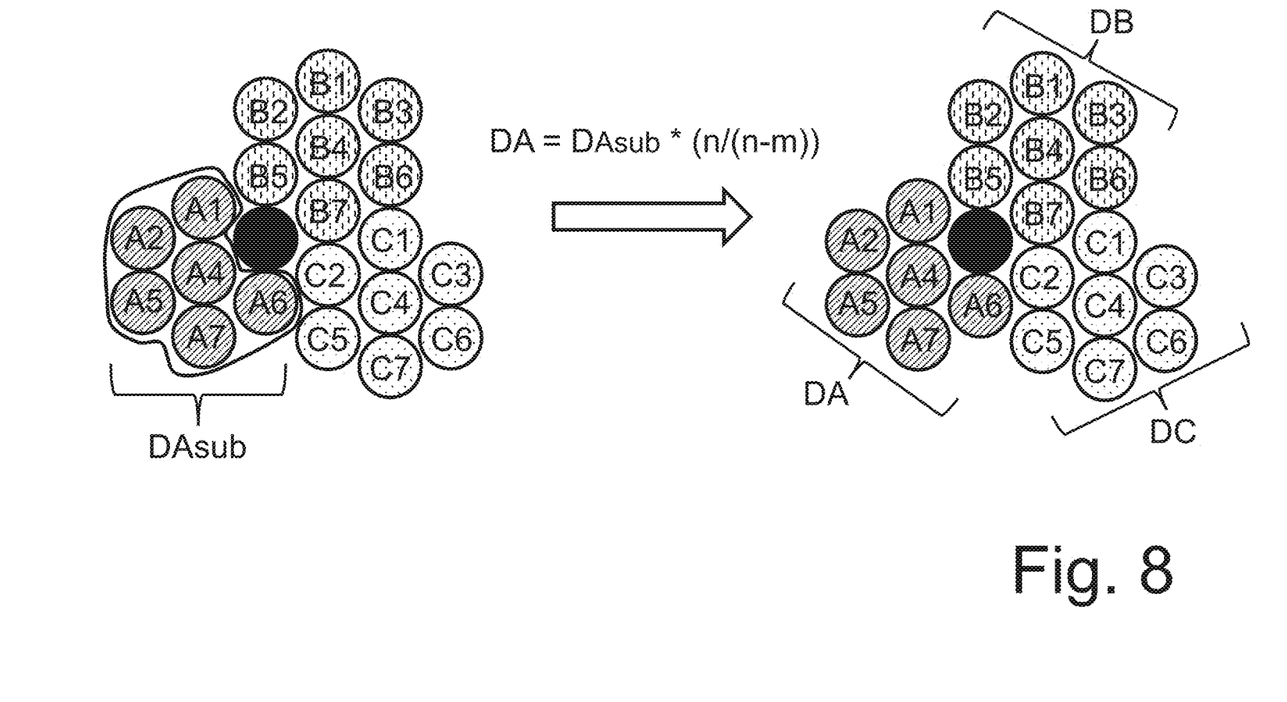
FIG. 8 shows a schematic illustration of a first sub-step and a second sub-step of a third configuration of an implementation (variant C)

In a further configuration of the method (variant C), the individual detectors A1 and A2 and also A4 to A7 are combined to form a detection channel DAsub (FIG. 8). The corrected measurement value for the defective individual detector A3 is determined by the resulting measurement value of the detection channel DAsub being multiplied by a factor (n/(n-m)). In this case, n is the number of individual detectors of the detection channel DA, i.e. seven in this example. The term m is the number of defective pixels in this detection channel. In the example, the detection channel DA is corrected with $$DA = DAsub * (n/(n-m)), \text{ i.e. with } DA = DAsub * 7/6.$$

The individual detectors B1 to B7 and also C1 to C7 are assigned to the detection channels DB and respectively DC in accordance with the basic pattern. Only three acquisition units are required, although the accuracy of the correction is somewhat lower than in the other two variants.

A computational adaptation of the centroid of the detection channel DA can optionally be performed. Since precisely the position of the defective pixel A3 is known, the centroid of the relevant detection channel and also the progression of the intensity distribution of the acquired measurement values, the intensity distribution being determined from a plurality of detection channels, can accordingly be adapted.

Figure 9:
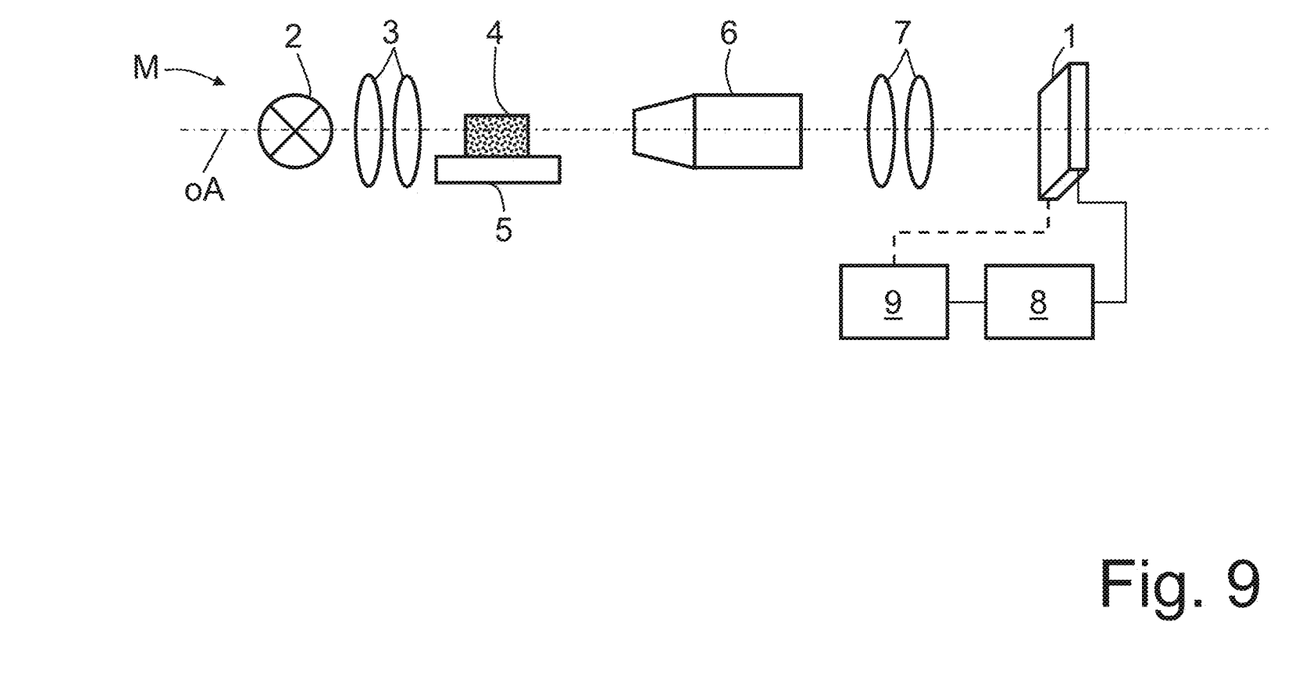
FIG. 9 shows a schematic illustration of an optical device, in particular, a microscope.

FIG. 9 shows, in a greatly simplified manner, a microscope M suitable for carrying out the techniques described herein. Proceeding from a light source 2, radiation (illumination radiation) including at least one selected wavelength reaches a sample 4 (object 4) by means of an illumination optical unit 3. Said sample is provided with at least one fluorophore, for example, which is excited to emission of fluorescence radiation by the action of the selected wavelength (excitation wavelength). The sample 4 can be present on an optionally adjustable sample stage 5.

Emitted fluorescence radiation, which can be transmitted or reflected radiation in various implementations, is collected as detection radiation by means of an objective 6 and is directed onto the array detector 1 by means of further optical elements 7. The detection radiation is acquired by said array detector as described above, and the corresponding measurement values for each individual detector or each detection channel are registered by a number of acquisition units 8 (shown in a simplified manner). The measurement values are communicated to an evaluation unit 9. The latter is configured to carry out implementations described herein. For this purpose, the evaluation unit 9 can also have a control function and for example set the manner of combination of the individual detectors to form detection channels in accordance with a basic pattern or a changed basic pattern (illustrated by dashed line).

In addition, the evaluation unit 9 can keep the list of defective individual detectors and, if appropriate, create updated lists.

| Reference signs | |
|---|---|
| 1 | Array detector |
| 2 | Light source |
| 3 | Illumination optical unit |
| 4 | Sample, object |
| 5 | Sample stage |
| 6 | Objective |
| 7 | Detection optical unit |
| 8 | Acquisition unit |
| 8DAsub | First acquisition unit |
| 8sec | Second acquisition unit |
| 8B, 8C | Acquisition unit (of the detection channels DB and DC) |
| 9 | Control unit/evaluation unit |
| oA | Optical axis |
| A1-A7; B1-B7; C1-C7 | Individual detector |
| A3k | Defective pixel with corrected measurement value |
| DA; DB; DC | Detection channel |
| DAsub, DBsub, DCsub | Interim detection channel |
| Dcomb | Combined detection channel |

The invention claimed is:

1. A method for correcting measurement values of a detection channel, wherein the measurement values are acquired by means of a specific arrangement of a plurality of individually readable individual optical detectors, the method comprising:

combining a plurality of individual optical detectors in accordance with a basic pattern to form a respective detection channel;

jointly assigning measurement values of the individual optical detectors to the respective detection channel;

when at least one of the plurality of individual optical detectors includes a defective individual detector, cancelling the combination of the plurality of individual optical detectors;

for the cancelled combination of individual detectors, defining a changed basic pattern for the plurality of individual optical detectors;

acquiring measurement values of the plurality of individual optical detectors according to the changed basic pattern;

correcting the measurement values of the defective individual detector based on the measurement values of individual detectors of the changed basic pattern; and after the correcting of the measurement values of the defective individual detector, evaluating the acquired measurement values for the detection channel.

2. The method of claim 1, wherein the plurality of individual optical detectors are respectively arranged adjacent to one another in accordance with the basic pattern.

3. The method of claim 1, wherein the measurement values of the individual detectors (A1 to C7) adjacent to the defective individual detector (A3) are read out individually, or wherein the adjacent individual detectors (A1 to C7) belonging to a respective common detection channel (DA, DB, DC) in accordance with the basic pattern are combined in each case, a mean value is formed from these measurement values and is allocated to the defective individual detector (A3) as a corrected measurement value and subsequently the measurement values and the corrected measurement values are assigned to each detection channel (DA, DB, DC) in accordance with the basic pattern, wherein at least one of the adjacent individual detectors (A1 to C7) used for correction is assigned to a different detection channel (DA, DB, DC) than the defective individual detector (A3) in accordance with the basic pattern.

4. The method of claim 1, characterized by the use of a first and a second acquisition unit (8), by means of which measurement values of separate individual detectors (A1 to C7) can be acquired simultaneously and independently of one another without loss of information, wherein the individual detectors (A1 to C7) without the defective individual detector (A3) are combined in accordance with the basic pattern and their measurement values are fed to a first acquisition unit (8DAsub), individual detectors (A1 to C7) adjacent to the defective individual detector (A3) are combined and their measurement values are fed as a combined detection channel (Dcomb) to a second acquisition unit (8sec), and the combined measurement values of the individual detectors (A1 to C7) of the changed basic pattern are used to calculate a corrected measurement value and to assign the latter to the defective individual detector as a corrected measurement value.

5. The method of claim 4, wherein the combined measurement values determined by means of the second acquisition unit (8sec) are used for calculating a corrected measurement value by multiplying their sum by a factor $1/n^*$, where $n^*$ is the number of individual detectors (A1 to C7) of the combined detection channel (Dcomb).

6. The method of claim 1, wherein the corrected measurement values are arithmetic or weighted mean values, or solutions of regression equations.

7. The method of claim 1, wherein those individual detectors (A1 to C7) whose measurement values are assigned to a specific detection channel (DA, DB, DC) and which comprise at least one defective individual detector (A3) are combined, without the defective individual detector (A3), in the sense of a changed basic pattern and the common measurement values of the relevant detection channel (DA, DB, DC) are multiplied by a factor n/(n−m), where n is the number of individual detectors (A1 to C7) assigned to the detection channel (DA, DB, DC) in accordance with the basic pattern and m is the number of defective individual detectors (A3) of the individual detectors assigned to the detection channel in accordance with the basic pattern, and the result is used for correcting the measurement values of the defective individual detectors.

8. The method of claim 7, wherein in an evaluation succeeding the acquisition of the measurement values, the spatial location of the centroid of the acquired measurement values (intensity distribution) is corrected.

9. The method of claim 1, wherein the positions and numbers of the defective individual detectors (A3) are determined beforehand and stored repeatedly retrievably.

10. The method of claim 1, wherein determining the defective individual detectors (A3) is repeated after a predefined time period and/or after the occurrence of changed operating conditions and, if appropriate, a list of defective individual detectors (A3) of the array is updated.

11. The method of claim 10, wherein the presence of changed operating conditions is determined on the basis of a respective threshold value of a predetermined operating parameter.

12. The method of claim 1, wherein measurement values of a plurality of detection channels (DA, DB, DC) are evaluated and an intensity distribution of acquired measurement values of at least one object (4) to be imaged is determined.

13. The method of claim 12, wherein the intensity distribution is used for determining an original location of a signal on which the measurement values are based, wherein the precision of the location determination is below (better than) a diffraction-limited determination of the original location.

* * * * *